May 10, 1949.　　　　B. P. SPROUL　　　　2,469,795
POLARIZING FILTER ATTACHMENT FOR CAMERAS
Filed Jan. 14, 1947
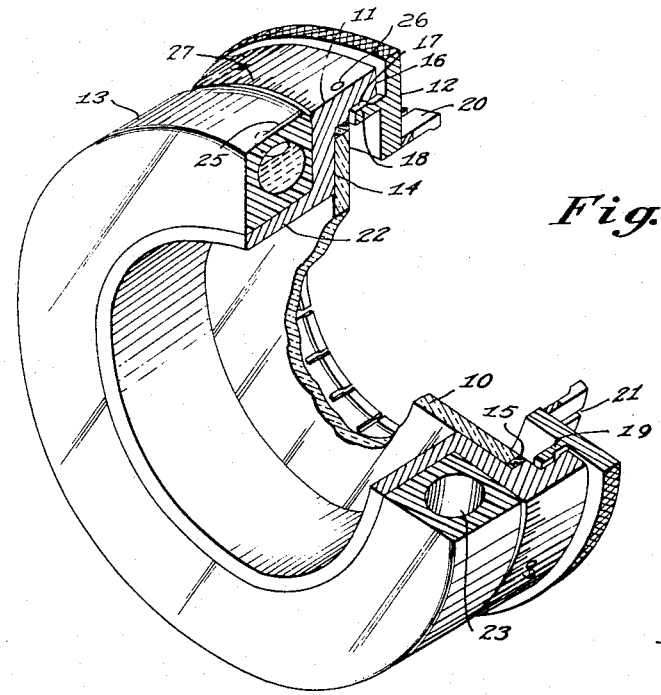
Fig. 1
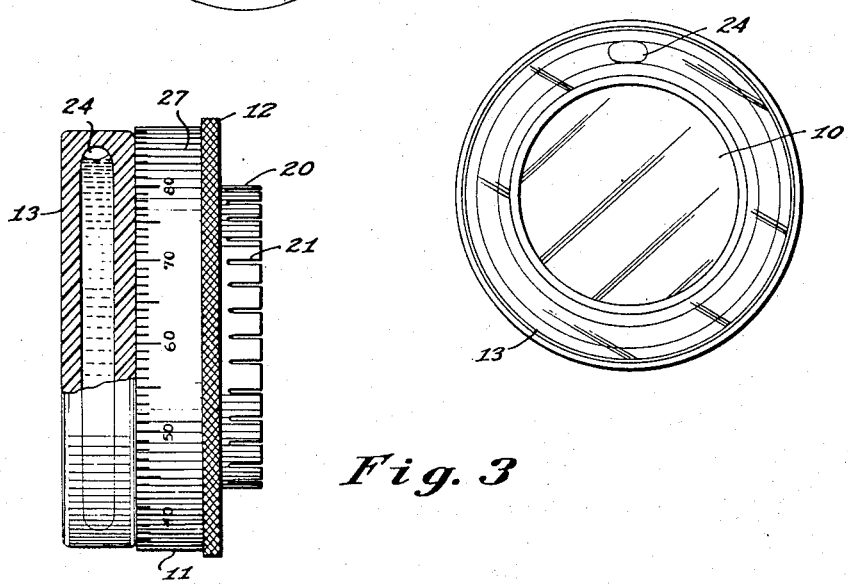
Fig. 2
Fig. 3
Inventor
BYRON P. SPROUL Patented May 10, 1949

2,469,795

SEARCH ROOM

UNITED STATES PATENT OFFICE 2,469,795

POLARIZING FILTER ATTACHMENT FOR CAMERAS

Byron P. Sproul, Royal Oak, Mich.

Application January 14, 1947, Serial No. 721,887

1 Claim. (Cl. 88—65)

This invention relates to polarizing filter attachment of the type used in combination with cameras in photography and in particular a gravitational adjusting device in the form of a circular spirit level by which the polarity of a filter may be set to a fixed predetermined position and scientifically adjusted in relation to the said fixed position.

The purpose of the invention is to provide means for adjusting the polarity of a filter while it is attached to the camera after a visual reading through the lens has been taken.

The polarity of polarizing filter attachment is adjusted by turning a filter about its central axis and whereas it is comparatively simple to rotate the filter until the desired polarity is obtained while looking through the filter this is not convenient or always possible when the filter is incorporated in a camera.

With this thought in mind this invention contemplates means for adjusting the polarizing characteristics of a filter from a graduated scale on the periphery of a frame in which the filter is mounted.

The object of the invention is to provide means for mounting a gravitational adjustment in combination with a graduated scale on a polarizing filter mounting for cameras and the like wherein the polarity of the filter may be adjusted after taking a visual reading through the filter while the lens is attached to the camera.

Another object of the invention is to provide means for attaching gravitational adjusting means to a polarizing filter wherein the combined elements may readily be inserted in a camera.

A further object of the invention is to provide a polarizing filter having a gravitational adjusting element associated therewith which is of a simple and economical construction.

With these and other objects in view the invention embodies a polarizing filter having an annular peripheral rim shaped to form an adapter through which it may be attached to a camera and having graduations on the outer surface, and a circular transparent element with a continuous concentric opening extending therethrough and having a liquid substantially filling said opening, mounted upon the peripheral rim of the filter.

Other features and advantages of the invention will appear from the following description taken in connection with the drawings, wherein:

Figure 1 is a view illustrating the filter with the gravitational adjusting elements in combination therewith with parts broken away.

Figure 2 is a view showing an end elevation of the device.

Figure 3 is a view showing a side elevation of the device with part broken away showing the transparent element with the fluid opening therein.

Referring now to the drawings wherein like reference characters indicate corresponding parts the polarizing filter gravitational adjusting device of this invention includes a polarizing filter 10, a rim providing a supporting frame 11, an adapter 12, and a circular transparent element 13.

The frame 11 is Z-shape in cross section and the filter 10 is mounted against a flat annular radial flange 14 thereof and the filter is secured in place by cement as indicated by the numeral 15. The inner surface of an outer circumferential flange 16 of the frame is provided with an annular recess 17 in which a projecting bead 18 on an inwardly extending circumferential flange 19 of the adapter 12 extends providing rotatable mounting means of the filter and frame therefor. The inner edge of the adapter is provided with an outwardly extending annular serrated flange 20 having longitudinally extending slits or kerfs 21 therein providing a plurality of resilient fingers or lugs by which the element may be attached to a camera or the like. It will be understood that the adapter may be of any other shape or design and may be provided with attaching means to correspond with the type of camera on which the attachment is used.

An inner circumferential flange 22 is provided on the opposite side of the frame 11 which provides a seat for the transparent annular ring 13, and the annular ring 13 is provided with a continuous annular opening 23 having a liquid therein. The liquid substantially fills the annular opening leaving a bubble 24 which remains at the highest point, as indicated in Figure 2, and with a graduation mark 25 on the ring 13 registering with the zero graduation 26 of the scale 27 on the surface of the frame 11 a certain position of the polarizing filter is indicated. With the characteristics of the polarizing filter known at this point different polarizing effects may be obtained by turning the filter so many degrees in either direction. By this means a photographer may readily adjust the polarity of a lens while the filter is attached to a camera after taking a visual reading through the filter.

It will be understood that a typical mounting is illustrated and that modifications may be made in the parts without departing from the spirit of the invention.

What is claimed is:

A polarizing filter attachment for cameras, comprising an annular Z-shaped frame including inner and outer circumferential flanges and an annular radial flange connecting the circumferential flanges, the outer surface of the outer circumferential flange being provided with a graduated scale thereon, a circular polarizing filter fixedly mounted within the outer circumferential flange adjacent said radial flange and in abutting engagement with the latter, an annular transparent ring fixedly mounted upon the outer surface of said inner circumferential flange adjacent said radial flange and in abutting engagement with the latter, said transparent ring being provided with an enclosed annular passage filled with a liquid having a bubble therein for coacting with said graduated scale to indicate the degree of polarity of said filter, said outer circumferential flange being provided with a circumferential recess in its inner surface thereof, an adapter for mounting said frame adjacent the lens of a camera, and means on said adapter in engagement with said recess for rotatably supporting said frame on said adapter, whereby rotation of said frame relative to said adapter until the bubble of said transparent ring coincides with the proper mark on the graduated scale causes a predetermined polarity of said filter to be obtained.

BYRON P. SPROUL.

REFERENCES CITED

The following references are of record in the file of this patent:

UNITED STATES PATENTS

| Number | Name | Date |
| --- | --- | --- |
| 516,898 | Olson | Mar. 20, 1894 |
| 1,283,963 | Takahashi | Nov. 5, 1918 |
| 1,622,752 | Yakesh | Mar. 29, 1927 |
| 1,966,149 | Stevens | July 10, 1934 |
| 2,125,908 | Frotschner | Aug. 9, 1938 |
| 2,145,914 | Bartels | Feb. 7, 1939 |
| 2,194,523 | Sauer et al. | Mar. 26, 1940 |

FOREIGN PATENTS

| Number | Country | Date |
| --- | --- | --- |
| 478,557 | Great Britain | Jan. 20, 1938 |
| 485,802 | Great Britain | May 25, 1938 |